United States Patent
Birke et al.

(10) Patent No.: US 7,141,333 B2
(45) Date of Patent: Nov. 28, 2006

(54) METHOD FOR PRODUCING AN ELECTROCHEMICAL ELEMENT

(75) Inventors: Peter Birke, Ellwangen (DE); Fatima Birke-Salam, Ellwangen (DE); Thomas Woehrle, Ellwangen (DE); Peter Haug, Ellwangen (DE); Konrad Holl, Aalen-Dewangen (DE); Heinrich Stelzig, Rosenberg (DE); Dejan Ilic, Ellwangen (DE)

(73) Assignee: Varta Microbattery GmbH (DE)

( * ) Notice: Subject to any disclaimer, the term of this patent is extended or adjusted under 35 U.S.C. 154(b) by 447 days.

(21) Appl. No.: 10/425,298

(22) Filed: Apr. 29, 2003

(65) Prior Publication Data

US 2003/0232244 A1    Dec. 18, 2003

(30) Foreign Application Priority Data

May 2, 2002    (DE) ................. 102 19 423

(51) Int. Cl.
  *H01M 2/08*    (2006.01)
  *H01M 10/04*    (2006.01)
(52) U.S. Cl. .................. 429/185; 29/623.5; 29/623.2
(58) Field of Classification Search .................. None
  See application file for complete search history.

(56) References Cited

U.S. PATENT DOCUMENTS

| | | | |
|---|---|---|---|
| 5,418,091 A | 5/1995 | Gozdz | |
| 5,460,904 A * | 10/1995 | Gozdz et al. | 429/316 |
| 5,879,834 A * | 3/1999 | Mao | 429/332 |
| 6,033,797 A | 3/2000 | Mao | |
| 6,057,061 A | 5/2000 | Callahan et al. | |
| 6,218,051 B1 | 4/2001 | Yokohata | |
| 6,815,123 B1 * | 11/2004 | Sun | 429/247 |
| 6,955,866 B1 * | 10/2005 | Nimon et al. | 429/231.95 |

FOREIGN PATENT DOCUMENTS

| | | |
|---|---|---|
| CA | 2269892 | 4/1999 |
| CN | 1147704 A | 4/1997 |
| CN | 1337757 A | 2/2002 |
| DE | 198 39 217 | 3/2000 |
| DE | 199 16 109 A1 | 10/2000 |
| DE | 200 10 080 U1 | 10/2000 |
| EP | 0 951 080 B1 | 10/1999 |
| EP | 1 011 157 A2 | 6/2000 |
| EP | 1 043 795 A2 | 10/2000 |
| EP | 1 096 591 A1 | 5/2001 |
| EP | 1 154 508 | 11/2001 |
| WO | WO 99/19921 | 4/1999 |

* cited by examiner

*Primary Examiner*—Patrick Joseph Ryan
*Assistant Examiner*—Karie O'Neill
(74) *Attorney, Agent, or Firm*—DLA Piper US LLP

(57) ABSTRACT

A method for producing an electrochemical element having at least one lithium-intercollating electrode and an organic electrolyte, at least one positive electrode, at least one negative electrode and at least one separator are joined together to form an element, with the separator being a porous matrix composed of at least about 60% by weight of a ceramic material A, which contains lithium ions, and a polymer as a binding agent. The resulting element is then introduced into a housing and impregnated with a liquid organic electrolyte B, whose conductive salt contains lithium ions, so that the ionic total conductivity of the separator is formed by adding the ion conductivities of A and B and the reciprocal of the specific contact resistance of the phase boundary between A and B, and is then closed such that it is sealed. A copolymer composed of vinylidene fluoride and hexafluoropropylene is used as the binder polymer. Material A is a naturally occurring mineral.

23 Claims, 1 Drawing Sheet

METHOD FOR PRODUCING AN ELECTROCHEMICAL ELEMENT

RELATED APPLICATION

This application claims priority of German Patent Application No. 102 19 423.8 filed May 2, 2002.

FIELD OF THE INVENTION

This invention relates to a method for producing an electrochemical element having at least one lithium-intercollating electrode and an organic electrolyte.

BACKGROUND

In electrochemical elements with lithium-intercollating electrodes in the form of rechargeable 4 V cells, the separator carries out a large number of extreme tasks. The negative electrode, which is normally based on carbon, has a lithium activity close to unity when the cell is in the fully charged state, which is generally 4.2 V. This means that, although the active material is a carbon modification, the reduced potential with the fully charged cell can be compared with that of metallic lithium. On the positive side, lithium transition metal oxides are generally used as the active material. When the cell is fully charged, this results in a very strong oxidation potential, which only a small number of substances withstand. Furthermore, the stability of a fully charged cell must not be adversely affected in a damaging manner even at increased temperatures, at least in the short term, in which context it is necessary to consider temperatures of up to 90° C. and a time period of at least two or more hours.

For this reason, polyolefin separators which are formed, for example, from polypropylene (PP), polyethylene (PE) or from two or more layers of these materials, are standard in rechargeable lithium cells. With uniaxial or biaxial stretching, these are provided with the necessary pore structure for holding the liquid electrolyte and, by way of example, the melting point of PE at about 120° C. is made use of to melt these pores in the event of an inadvertent short circuit or a rise in the temperature in the cell interior caused in any other way, thus resulting in a so-called "shut-down effect." This is a drastic rise in the internal resistance, since the closing of the pores means that the liquid electrolyte no longer provides conductivity in the separator.

EP 0 951 080 B1 describes a battery separator comprising a first and a third microporous layer, with a second microporous membrane with a shut-down capability between them, and with the porous membranes being produced using a stretching process.

However, it has been found in practice that this effect does not always work reliably. In the event of a very short and severe temperature rise, the shut-down mechanism may no longer work in some circumstances. Drastic temperature rises such as these may occur in particular when the cell is poked from the outside with a conductive sharp object, and in the event of overcharging of the cell. This negative reversal of the shut-down mechanism is associated with the polyolefin separators shrinking during melting. The greater and stronger the sudden energy rise, the greater is the shrinkage process. This results not only in pores being closed, but in the entire separator collapsing by shrinkage in a disadvantageous manner such that the cell is short-circuited and, thus, reacts even more strongly, with possible ignition of the cell. The method of producing uniaxial or biaxial stretching to produce pores in the separators may in this case also have a disadvantageous effect since the separator collapses in the form of shrinkage like a spring in the stretching direction as a result of the memory effect, which is associated with the production process. Particularly in the case of large lithium cells, such as those for 42 Volt vehicle power supply systems or traction purposes, a solution to the separator problem as described above is essential.

EP 1 096 591 A1 describes a gel-like separator membrane with a binder polymer from the group comprising polyacrylonitrile, polymethyl methacrylate, polyvinyl chloride, polyvinyl sulphone, polyethylene glycol diacrylate, polyvinylpyrrolidone, polyvinylidene difluoride or mixtures thereof with a ceramic material chosen from $Al_2O_3$, $SiO_2$, $TiO_2$, $ZrO_2$, or mixtures thereof.

EP 1 043 795 A2 describes a composite electrode, which is formed from active electrode material, a conductivity enhancer, a polymer electrolyte and a mineral, naturally occurring solid electrolyte.

U.S. Pat. No. 6,057,061 discloses a battery separator comprising an oriented microporous film which contains ethylene vinyl alcohol (EVA) and has a chemically inert filling material chosen from glass-like ceramic, polytetrafluoroethylene (PTFE) or condensed plastic particles having rubber-like characteristics.

EP 1 011 157 A2 describes a separator material for rechargeable lithium batteries using a polyvinylidene difluoride hexafluoropropylene as the binding agent, in which particles with a higher softening temperature are dispersed.

DE 199 16 109 A1 describes composite bodies which are suitable for use as separators in electrochemical cells, with at least one first layer which contains at least one solid being applied to at least one second layer composed of a conventional separator material.

DE 200 10 080 U1 describes a rechargeable battery based on solid ion conductors with a solid electrolyte arranged between the positive and negative electrodes, with the negative electrode also being formed from carbon nanostructures.

It would therefore be advantageous to provide a method for producing an electrochemical element with fire protection characteristics, in which dangerous shrinkage of the separator in response to a short-term very severe temperature rise in the cell is prevented and in which the cell is prevented from igniting, but whose separator at the same time has better ionic conductivity.

SUMMARY OF THE INVENTION

A method of producing an electrochemical element disclosed and comprises joining together at least one positive electrode, at least one negative electrode and at least one separator to form an element, wherein the separator contains a porous matrix composed of at least about 60% by weight of a ceramic material A, containing lithium ions and a polymer as a binding agent; introducing the element into a housing; impregnating the element with a liquid organic electrolyte B, whose conductive salt contains lithium ions so that ionic total conductivity of the separator is formed by adding ion conductivities of A and B and the reciprocal of specific contact resistance of phase boundary between A and B; and sealing the housing.

DETAILED DESCRIPTION

Figure 1:
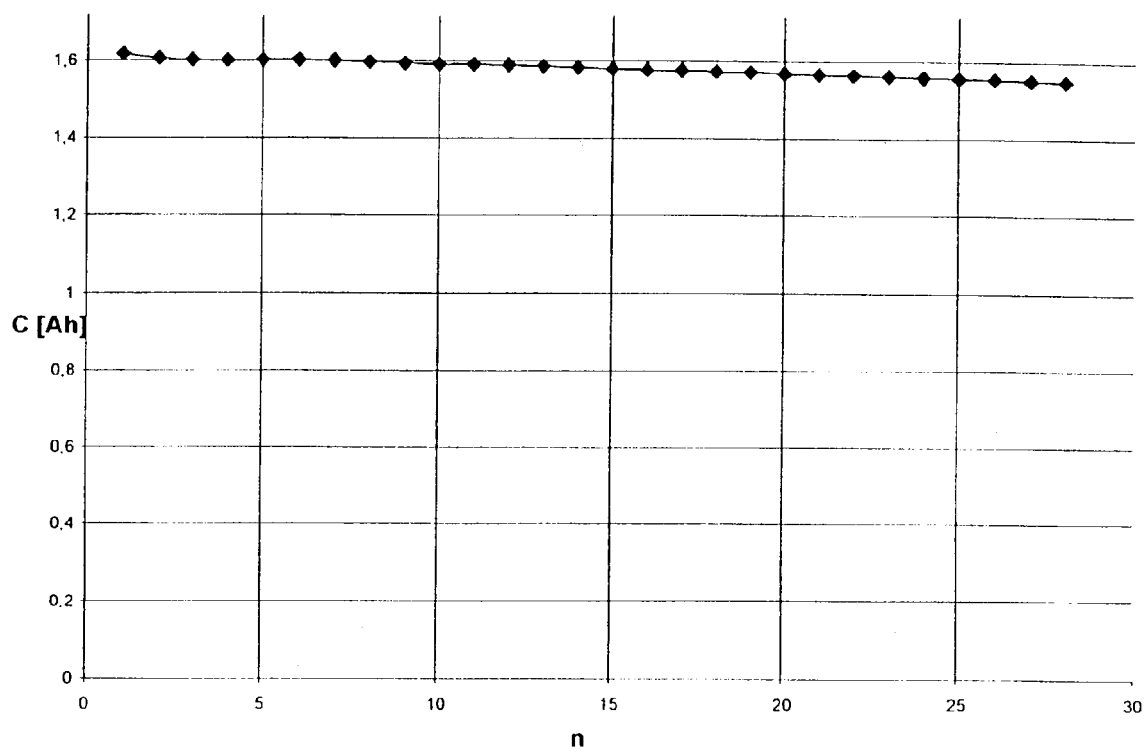
FIG. 1 is a graph showing capacity C as a function of the number of cycles n for a cell produced according to Example 1.

Lithium salts have an intrinsic ion conductivity as a result of structural lattice defects and, in particular, as a result of surface defects in the grain surfaces. If a separator with a solid ceramic lithium salt which is dispersed in a polymer binding agent is impregnated with a liquid lithium electrolyte, then the individual conductivities σ add up as follows:

$$\sigma_{tot} = \sigma_{ion,solid} + \sigma_{ion,surface} + \sigma_{ion,liquid}$$

This advantageously results in an increase in the total ionic conductivity of the separator in comparison to an inert polyolefin separator which can achieve its total conductivity only via the pores that are filled with liquid electrolyte. Grain sizes in the region of a $d_{50}$ distribution value of about 1 μm are preferably used to achieve a grain surface with as low a contact resistance as possible. This is a value which can still be achieved using conventional grinding methods. Solid ion conductors may be used in a particularly effective manner whenever a solid-liquid phase boundary can be established to a liquid auxiliary electrolyte or electrode.

Furthermore, the ceramic filling material must also have, as important characteristics, a wide electrochemical stability window with respect to reduction and oxidation, no or extremely low hygroscopy, and low material costs. Only a small number of compounds are stable in the conditions mentioned initially, with lithium activity close to unity on the one hand and an oxidation potential of more than about 4 V with respect to lithium on the other hand. This stability window reduces the elements to a small number of preferred main group elements such as boron, aluminium, silicon, phosphorus, nitrogen, oxygen and fluorine. This is also justified by the requirement for a high electronic isolation capability, which should result at least in an electronic residual conductivity of less than about $10^{-10}$ S/cm.

Transition metals, or elements with a high valency, can result in a sudden conductivity increase by two or more orders of magnitude by simultaneous adsorption of an electron, instead of pure ion conduction. Ceramic lithium ion conductors such as $Li_5AlO_4$, $Li_4SiO_4$ have a wide stability window of 0–5.5 V, but are costly to produce and highly hygroscopic.

Thus, according to the invention, compounds are used which naturally occur in large quantities and with acceptable purity and which are at the same time neither hygroscopic nor costly. Examples of salts include, but are not limited to, amblygonite, lepidolite, petalite and, as the most common and most important lithium mineral, spodumene, Li—$AlSi_2O_6$. The latter salt also has a considerable advantage as a glass-forming substance, which can be referred to by analogy as "super shut-down." When the temperature at which glass is formed is reached, then the ceramic material, which is preferably used in very large quantities with filling levels of at least about 60% by weight and preferably of at least about 75% by weight, deliquesces. In this case, there is no need to be concerned about spontaneous shrinkage as in the case of polyolefin separators. Furthermore, the ceramic component improves safety, since more inert material is available for damping flames in the event of misuse. A ceramic separator is of major advantage particularly when using an overcharging additive, since it can further reinforce the good characteristics of the latter in an extremely advantageous manner.

The filling levels relate to the state when all the components are weighed without the solvent. A copolymer is preferably used as the binding agent to allow flexible sheets and a softening temperature of less than 150° C. One suitable material is the copolymer polyvinylidene difluoride hexafluoropropylene, PVDF-HFP, whose HFP component is about 5–8%. A plasticizer can also be added to the recipe to achieve an advantageous pore structure, which is then washed out again before filling with the liquid organic electrolyte.

Examples of overcharging additives include, but are not limited to, 3,5-difluoroanisole, 1,3,5-trimethyoxybenzene, 2-methoxyethyl ether, triethylene glycol dimethyl ether, tetraethylene glycol dimethyl ether, 1,2,4-trifluorobenzene, biphenyl, 1,2,3,4-tetrafluorobenzene, 2,4,6-trimethoxypyrimidine, 2-6-dimethoxy-1,4-benzoquinone and 2,4-dimethoxybenzonitrile. The mechanism of operation of these additives appears to be based on voltage-dependent collapse of the preferably ring-like structure, with these fragments polymerizing the liquid organic electrolyte or causing surface passivation of the cathode.

If a lithium ion cell having an electrode which contains $LiCoO_2$—$LiCoO_2$ is a standard material used because it has a large number of electrochemical advantages—and having a polyolefin separator is overcharged, the cell becomes critical at voltages of about 4.8 V or more, that is to say it is about to run away thermally and burst into flames. An overcharging additive is broken down in this voltage range, and the decomposition products suppress the internal current flow in the cell within a very short time. If the decomposition voltage of the additive is chosen to be too low, then this will also have a negative influence on normal cell operation.

A ceramic separator can now advantageously shift the critical 4.8 V, as mentioned above, upwards by about a few 100 mV, thus allowing the use of overcharging additives, with decomposition voltages that are better because they are higher. One example of an additive is 1,2,4-trifluorobenzene with a decomposition voltage in the region of about 5.2 V, so that there is a buffer of about 1 V at a normal maximum charging voltage for the cell of 4.2 V.

EXAMPLE

A pasty substance was produced for the negative electrode (anode) by thoroughly mixing 2,887 g of spherical graphite with 82 g of conductive carbon black, 371 g of binder polymer (polyvinylidene difluoride hexafluoropropylene) and 859 g of dibutyl phthalate in 3 l of acetone, drawing out the resulting substance onto a polyester substrate sheet, and allowing it to dry.

A pasty substance for the separator was produced by thoroughly mixing 3,150 g of spodumene, 336 g of binder polymer and 336 g of dibutyl phthalate in 2.5 l of acetone, and by drawing out the resulting substance onto a polyester substrate sheet, and allowing it to dry.

A pasty substance for the positive electrode (cathode) was produced by thoroughly mixing 2,819 g of $LiCoO_2$, 198 g of conductive carbon black, 297 g of binder polymer and 495 g of dibutyl phthalate in 4.8 l of acetone, and then drawing out the resulting substance onto a polyester substrate sheet, and allowing it to dry.

The negative electrode was stamped out in 8.50×6.05 $cm^2$ pieces and laminated, at 130° C., onto both sides of a copper output electrode with output conductor lugs at 30 kg. The separator was then laminated in a projecting manner onto the negative electrode at 110° C. and a pressure of 10 kg. The positive electrode was stamped out into 8.35×5.90 $cm^2$ pieces and laminated onto aluminium expanded metal with output conductor lugs, at 140° C. and a contact pressure of 20 kg. The aluminium extended metal was pretreated with an adhesion layer (primer) to improve the electrode adhesion. The resulting cathodes were laminated onto both sides of the separator anode assembly at 120° C. and 10 kg, and the projecting separator edge cut off, except for a small residual projection. The plasticizer dibutyl phthalate was then washed out of the bicells by means of solvent to provide sufficient porosity for the ingress of the electrolyte. Five such bicells were welded by ultrasound to the output conductor lugs with a solid nickel output conductor on the negative side and an aluminium output conductor on the positive side. The resulting stack was packed in a thermoformed aluminium sheet that was coated on both sides, and activated with approximately 7 ml of organic lithium electrolyte.

The fully charged cell (4.2 V) reacted far more moderately than a cell produced in a comparable manner with a polyolefin separator when poked with a sharp conductive object. When a cell produced according to the above example was overcharged at 12 V and 1 C (approximately 1.5 A), it reacted only by producing smoke and blowing out gases, while a comparable cell with the polyolefin separator burns away completely with large amounts of heat and flames being produced.

FIG. 1 is a graph showing capacity C as a function of the number of cycles n for a cell produced according to Example 1. The cell was charged to 4.2 V at a constant 1 C (1.5 A) current, the voltage was then maintained for 3 hours, and the cell was then discharged to 3.0 V at 1 C (1.5 A). The small drop in the curves obtained in this way clearly shows that the cells produced in this way have a high reliability.

What is claimed is:

1. A method of producing an electrochemical cell having at least one lithium-intercalating electrode comprising:
    joining together at least one positive electrode, at least one negative electrode and at least one separator to form an element, wherein the separator contains a porous matrix composed of at least about 60% by weight of a ceramic material A, said ceramic material A being a naturally occurring mineral containing lithium ions, and a polymer as a binding agent, said polymer being a copolymer composed of vinylidene fluoride and hexafluoropropylene;
    introducing the element into a housing;
    impregnating the element with a liquid organic electrolyte B, whose conductive salt contains lithium ions so that ionic total conductivity of the separator is formed by adding ion conductivities of A and B and the reciprocal of specific contact resistance of phase boundary between A and B; and
    sealing the housing.

2. The method according to claim 1, wherein the solvent for the binder polymer is N-methylpyrrolidin-2-one or acetone.

3. The method according to claim 1, wherein the separator contains at least about 75% by weight of ceramic material A.

4. The method according to claim 1, wherein the electronic conductivity of the ceramic material A is less than about $10^{-10}$ S/cm.

5. The method according to claim 1, wherein the ceramic material A is a glass-forming substance.

6. The method according to claim 1, wherein the amount of hexafluoropropylene in the copolymer is less than about 8%.

7. The method according to claim 1, wherein the organic electrolyte contains $LiPF_6$, diethyl carbonate or ethylene carbonate.

8. The method according to claim 1, wherein the organic electrolyte contains an additive whose decomposition products lead to collapse of the charging current in the event of over-charging.

9. The method according to claim 8, wherein the proportion of the additive in the organic electrolyte is about 2–20% by weight.

10. The method according to claim 8, wherein the additive is an aromatic compound.

11. The method according to claim 10, wherein the aromatic compound is trifluorobenzene or biphenyl.

12. An electrochemical cell produced by the method according to claim 1.

13. A method of producing an electrochemical cell comprising:
    joining together 1) at least one positive electrode, 2) at least one negative electrode and 3) at least one separator comprising a porous matrix composed of at least about 60% by weight of a ceramic material A, which is a naturally occurring mineral containing lithium ions, and a copolymer composed of vinylidene fluoride and hexafluoropropylene as a binder;
    introducing the element into housing;
    impregnating the element with a liquid organic electrolyte B having a conductive salt containing lithium ions so that ionic total conductivity of the separator is formed by adding ion conductivities of A and B and the reciprocal of specific contact resistance of phase boundary between A and B;and
    sealing the housing.

14. The method according to claim 13, wherein the solvent for the binder polymer is N-methylpyrrolidin-2-one or acetone.

15. The method according to claim 13, wherein the separator contains at least about 75% by weight of ceramic material A.

16. The method according to claim 13, wherein the electronic conductivity of the ceramic material A is less than about $10^{-10}$ S/cm.

17. The method according to claim 13, wherein the amount of hexafluoropropylene in the copolymer is less than about 8%.

18. The method according to claim 13, wherein the organic electrolyte contains $LiPF_6$, diethyl carbonate or ethylene carbonate.

19. The method according to claim 13, wherein the organic electrolyte contains an additive whose decomposition products lead to collapse of the charging current in the event of over-charging.

20. The method according to claim 19, wherein the proportion of the additive in the organic electrolyte is about 2–20% by weight.

21. The method according to claim 19, wherein the additive is an aromatic compound.

22. The method according to claim 21, wherein the aromatic compound is trifluorobenzene or biphenyl.

23. An electrochemical cell produced by the method according to claim 13.

* * * * *